(12) United States Patent
Cote

(10) Patent No.: US 12,342,796 B2
(45) Date of Patent: Jul. 1, 2025

(54) ADJUSTABLE SPRING SYSTEM FOR USE IN BIRD FEEDERS

(71) Applicant: BROME BIRD CARE INC., Knowlton (CA)

(72) Inventor: Paul L. Cote, Knowlton (CA)

( * ) Notice: Subject to any disclaimer, the term of this patent is extended or adjusted under 35 U.S.C. 154(b) by 490 days.

(21) Appl. No.: 17/684,045

(22) Filed: Mar. 1, 2022

(65) Prior Publication Data

US 2022/0279762 A1    Sep. 8, 2022

Related U.S. Application Data

(60) Provisional application No. 63/156,206, filed on Mar. 3, 2021.

(51) Int. Cl.
*A01K 39/01* (2006.01)

(52) U.S. Cl.
CPC ............................... *A01K 39/0113* (2013.01)

(58) Field of Classification Search
CPC .................................................. A01K 39/0113
See application file for complete search history.

(56) References Cited

U.S. PATENT DOCUMENTS

| | | | | |
|---|---|---|---|---|
| 7,191,731 | B2* | 3/2007 | Cote | A01K 39/0113 119/57.9 |
| 7,219,621 | B2* | 5/2007 | Coroneos | A01K 39/0113 119/51.01 |
| 8,230,809 | B2* | 7/2012 | Cote | A01K 39/0113 119/52.3 |
| 9,320,263 | B2* | 4/2016 | Cote | A01K 39/0113 |
| 2002/0139311 | A1* | 10/2002 | Cote | A01K 39/0113 119/57.9 |
| 2003/0226514 | A1* | 12/2003 | Cote | A01K 39/0113 119/57.9 |
| 2009/0283044 | A1* | 11/2009 | Black | A01K 39/012 119/51.01 |
| 2010/0258055 | A1* | 10/2010 | Cote | A01K 39/0113 119/52.3 |
| 2015/0305311 | A1* | 10/2015 | Murray | A01K 39/012 119/51.01 |
| 2015/0366168 | A1* | 12/2015 | Cote | A01K 39/012 29/434 |
| 2016/0262357 | A1* | 9/2016 | Cole | A01K 39/014 |
| 2017/0164585 | A1* | 6/2017 | Cote | A01K 39/0113 |
| 2017/0258053 | A1* | 9/2017 | Teh | H04B 7/18589 |
| 2019/0159432 | A1* | 5/2019 | Bruno | A01K 39/0113 |
| 2022/0349206 | A1* | 11/2022 | Burton | A01K 39/01 |

* cited by examiner

*Primary Examiner* — Monica L Perry
*Assistant Examiner* — Brittany A Lowery
(74) *Attorney, Agent, or Firm* — Andrews Robichaud PC; Alessandro Colonnier

(57) ABSTRACT

The present disclosure provides an adjustable spring system, which is comprised of a central rod positioned partially within a member. A spring is positioned over the central rod, confined in the area in between the lower cap and the member. The member is attached to and capped by an end cap, and the member is threaded onto the central rod. As such, rotation of the end cap or the member directly correspondingly rotates the member, which moves up or down along the length of the central rod. When the adjustable spring system is installed within a bird feeder, it allows an operator to choose the amount of compression of the spring, which in turn affects the ability of the central rod to move with respect to the seed tray.

12 Claims, 10 Drawing Sheets

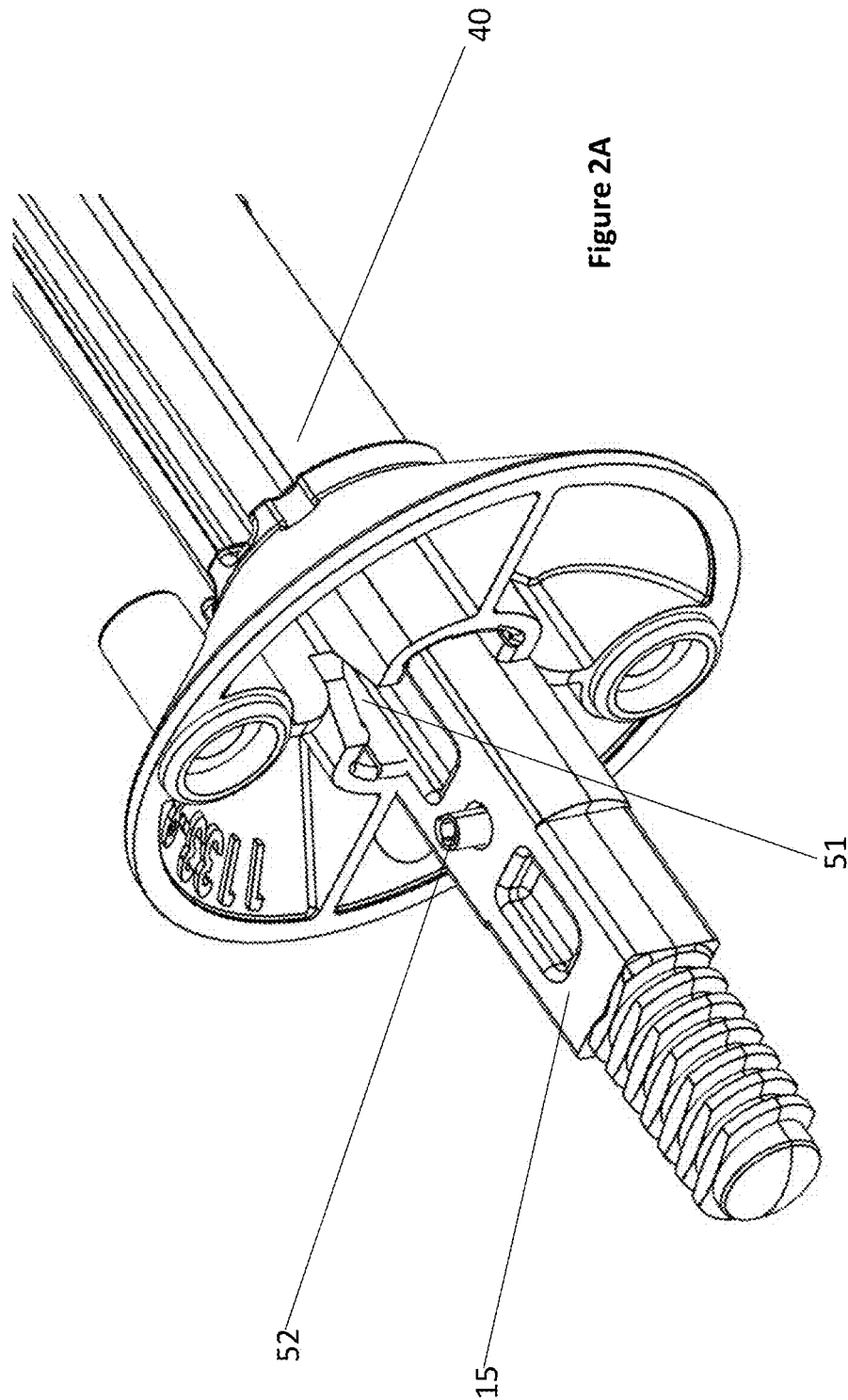

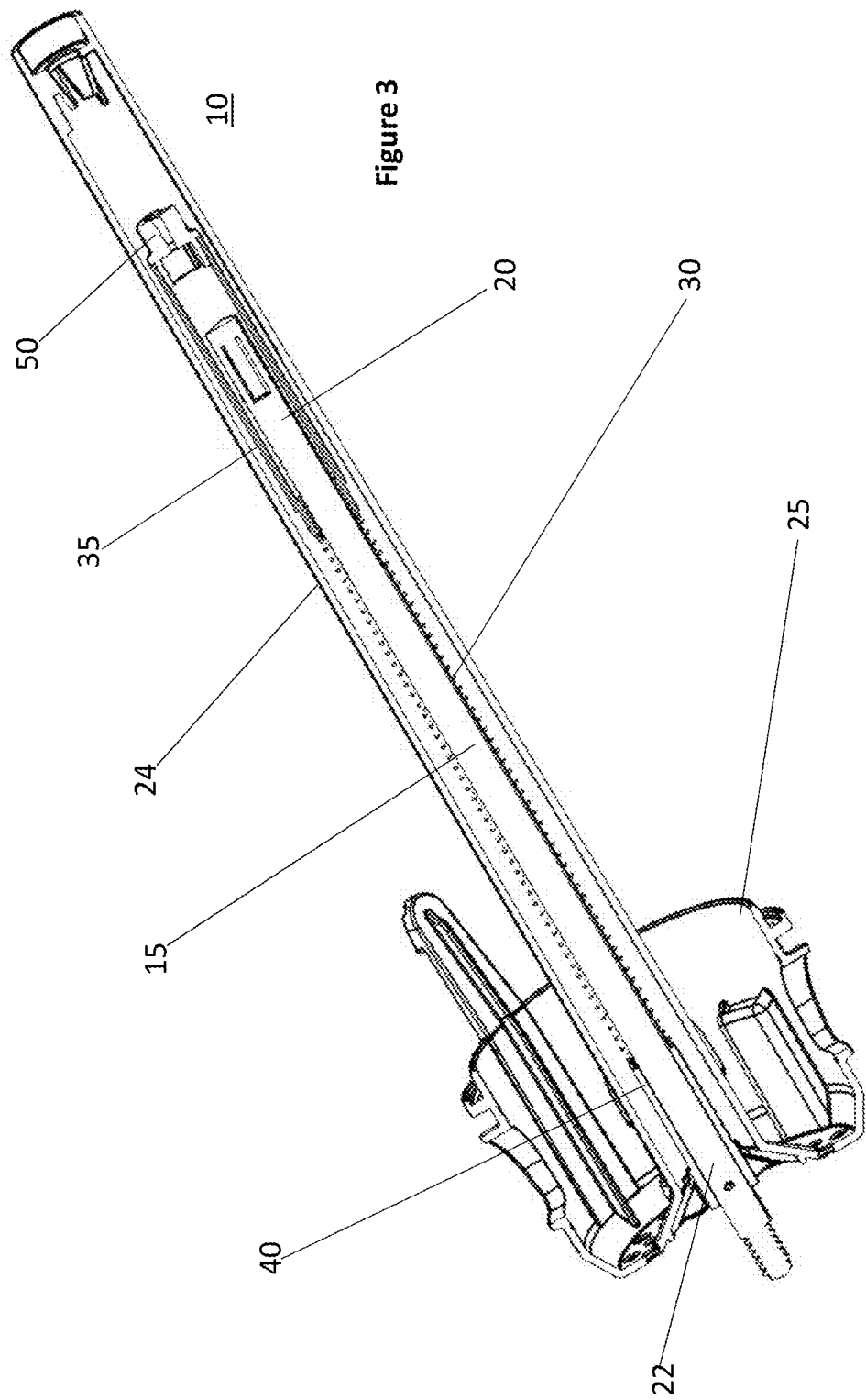

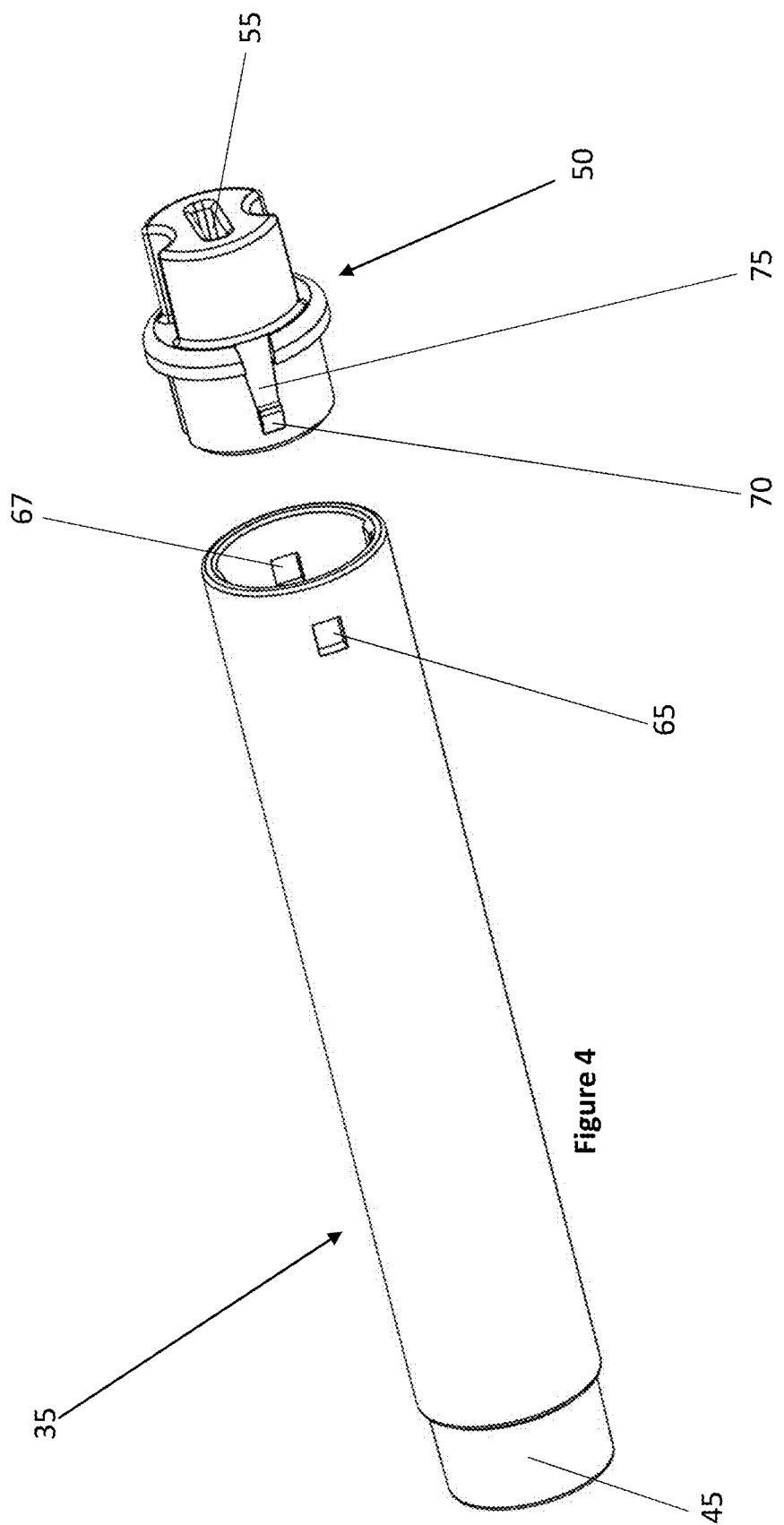

ADJUSTABLE SPRING SYSTEM FOR USE IN BIRD FEEDERS

CROSS REFERENCE TO RELATED APPLICATION

The present application claims priority to U.S. Provisional Application No. 63/156,206, entitled "ADJUSTABLE SPRING SYSTEM" filed on Mar. 3, 2021, the contents of which are incorporated herein by reference in their entirety.

FIELD

The disclosure relates generally to the field of bird feeders, and more specifically to an adjustable spring system for bird feeders.

BACKGROUND

Bird feeders have been around for quite some time for bird watchers and animal lovers. Bird feeders such as the ones described herein utilize a spring mechanism to have a shroud move up or down relative to a seed tube. Indeed, some bird feeders have two sets of openings (one on the shroud and the other on the seed tube) that provide access to bird feed when the bird feeder is in a position at rest, or when a bird rests of the shroud. As heavier animals such as squirrels hang onto the shroud, the shroud moves downwardly and misaligns the two sets of openings and therefore prevents access to bird feed. Unfortunately, many problems arise in the manufacturing and assembly of bird feeders due to inconsistencies in spring manufacturing. Indeed, it is known in the art that springs vary in strength and compressibility, even if those springs are made by the same manufacturer. Bird feeder spring systems need to actuate and move up and down based on specific weights of squirrels versus birds. The spring within the spring system needs to be precise to compress under the weight of a squirrel and remain generally uncompressed under the weight of a bird. As such, there is a need for a spring system for bird feeders to adjust the spring compression.

SUMMARY

In an aspect, the present disclosure provides an adjustable spring system comprising: a central rod having an upper end and a lower end; a compressible component positioned around the central rod; an elongated member engaged with the upper end of the central rod, the elongated member moveable in between a first position and a second position; and, a cap positioned at the lower end of the central rod, wherein adjustment of the elongated member moves the elongated member from the first position to the second position.

In another aspect, the present disclosure provides a bird feeder comprising: a seed container to contain seeds; a seed tray secured to the seed container, the seed tray comprised of at least one opening to access the seeds; a shroud connected to the seed tray, the shroud to protect at least a portion of the seed container and seed tray; a cover releasably secured to the seed container; and, an adjustable spring system secured to the seed tray, the adjustable spring system providing for an adjustable movement of the shroud relative to the seed tray between a first position and a second position.

BRIEF DESCRIPTION OF THE DRAWINGS

The following figures serve to illustrate various embodiments of features of the disclosure. These figures are illustrative and are not intended to be limiting.

FIG. 2A is an underside, enlarged perspective view of a lower cap connected to a central rod of the adjustable spring system shown in FIG. 1, according to an embodiment of the present disclosure;

FIG. 3 is a perspective view of the adjustable spring system shown in FIG. 1, positioned in a seed tray of a bird feeder, according to an embodiment of the present disclosure;

FIG. 4 is an exploded perspective view of a member and an end cap of the adjustable spring system shown in FIG. 1, according to an embodiment of the present disclosure;

DETAILED DESCRIPTION

Figure 1:
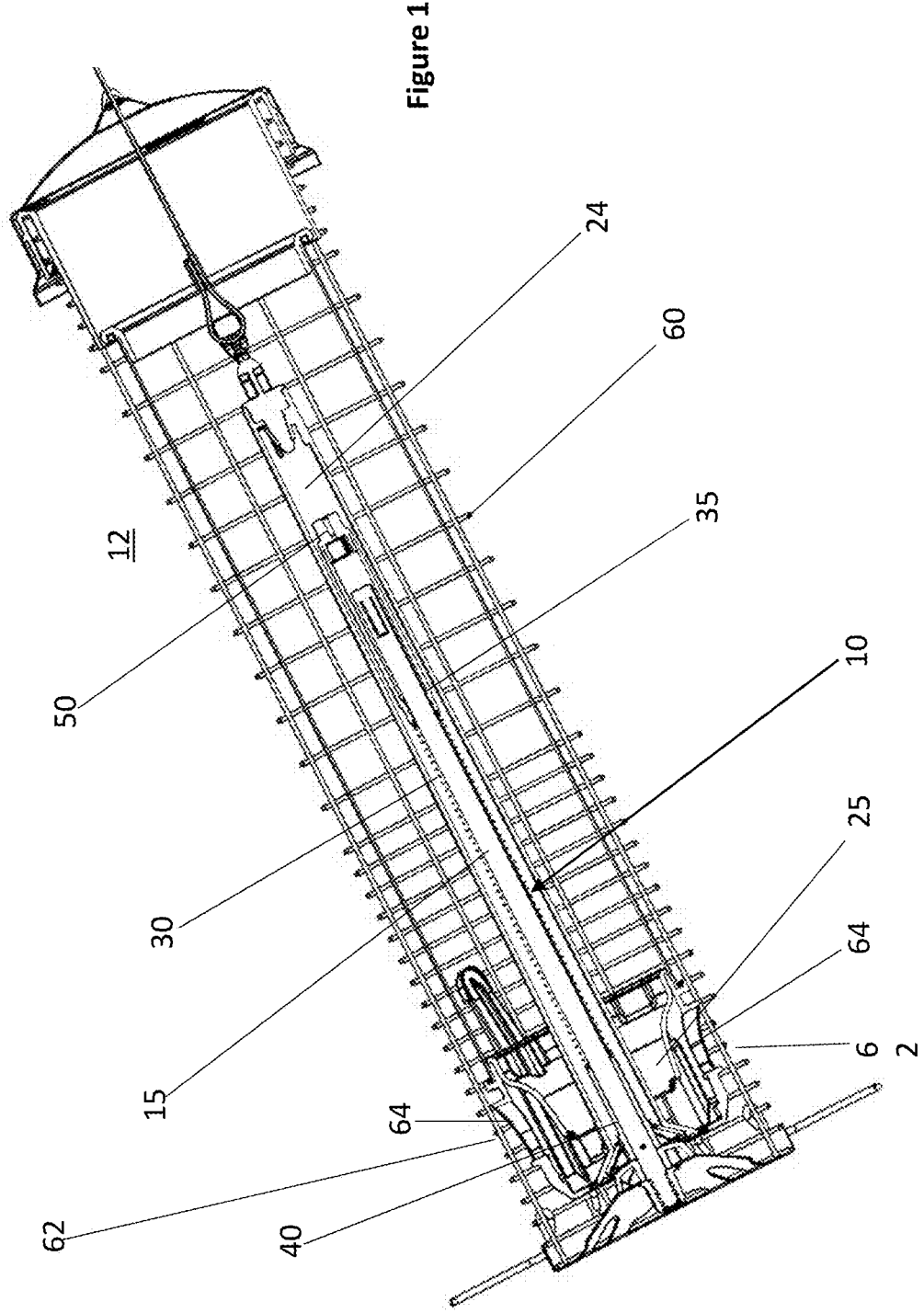
FIG. 1 is a perspective cross-sectional view of an adjustable spring system in a bird feeder, according to an embodiment of the present disclosure.
Figure 2:
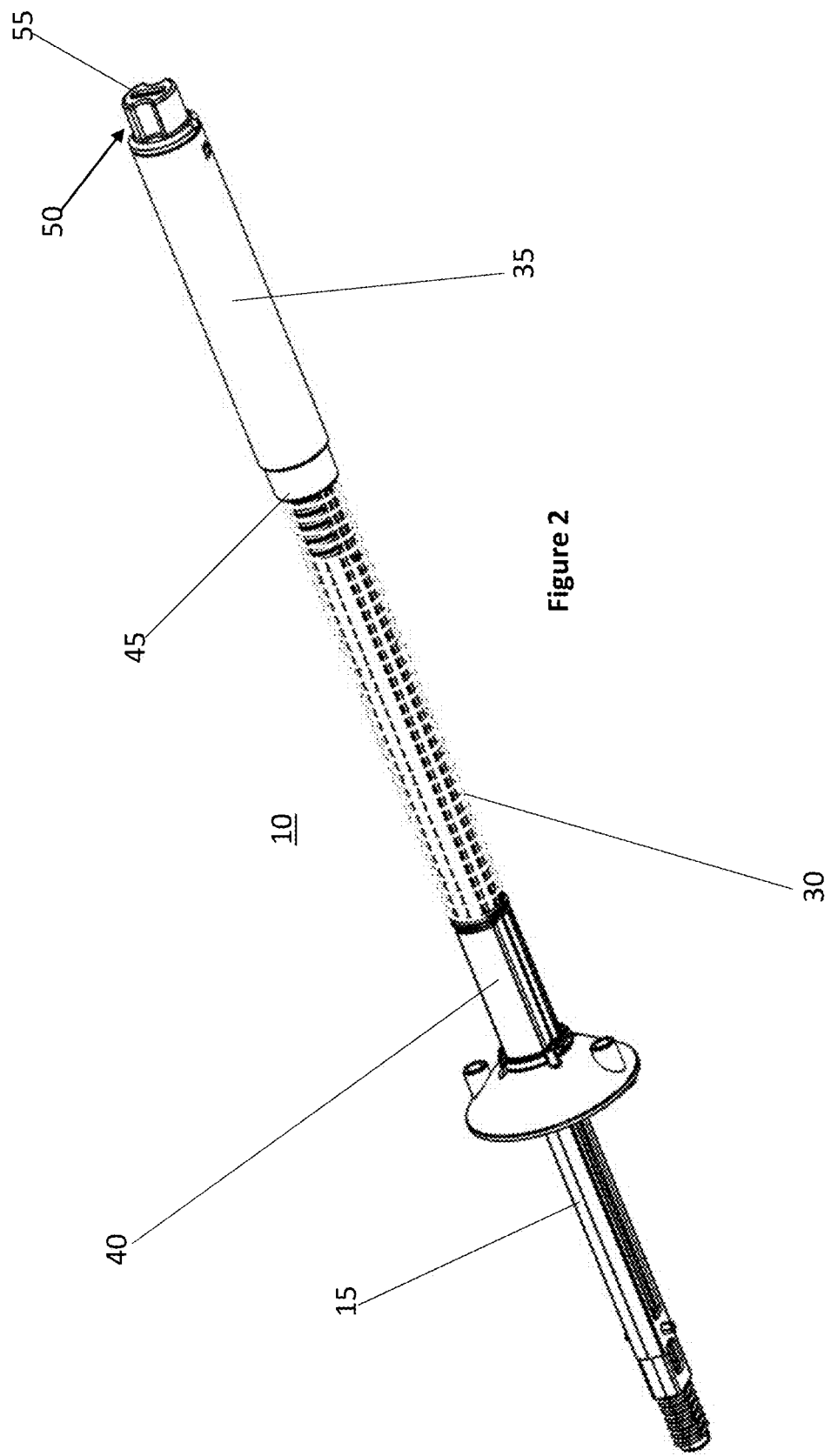
FIG. 2 is a perspective view of the adjustable spring system shown in FIG. 1, according to an embodiment of the present disclosure.

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

With reference to FIGS. 1, 2, 2A and 3 and according to an embodiment of the present disclosure, an adjustable spring system 10 is shown positioned within a bird feeder 12. The spring system 10 is further comprised of a central rod 15, the central rod 15 having upper and lower ends 20, 22. As shown, the adjustable spring system 10 is secured within a hollow post 24 of a seed tray 25 as found in the bird feeder 12. The adjustable spring system 10 is further comprised of a compressible component such as coil or spring 30, the spring 30 positioned around the central rod 15. The spring 30 is confined around the central rod 15, in between an elongated member 35 and a lower cap 40. The lower cap 40 is secured to the seed tray 25 by means of screws (not shown) and is otherwise not attached to the central rod 15. The lower cap has a rectangular-shaped opening (not shown) that corresponds to the rectangular shape of the lower end 22 of the central rod 15. The corresponding shapes of the lower cap 40 and lower end 22 of the central rod 15 serve to limit the lower cap 40 to desired, specific orientations over the central rod 15. Further, the lower cap 40 cannot rotate independently from the central rod 15 and any rotational movement of the seed tray 25 is translated to the central rod 15 via the lower cap 40. The elongated member 35 is in threaded engagement with the upper end 20 of the central rod 15. The elongated member 35 is comprised of a stepped portion 45 at a lower end thereof, the stepped portion 45 abutting against the spring 30. The spring system 10 is also further comprised of an end cap 50, the end cap 50 attached to the member 35 as further described below. As the end cap 50 is attached to the member 35, rotation of the end cap 50 correspondingly rotates the member 35. Indeed, a screwdriver can be inserted into an opening 55 of the end cap 50 to rotate the end cap 50. Rotation of the end cap 50 correspondingly rotates the member 35, which rotates downwardly on the threads of the central rod 15 from a first position to a second position as further described below. As the spring 30 is positioned in between the member 35 and the lower cap 40, downward movement of the member 35 compresses the spring 30. A worker skilled in the art would understand that in the field of bird feeders, weight placed on a shroud 60 of the bird feeder 12 by animals such as squirrels, pulls the central rod 15 downwardly, compressing the spring 30 up to a certain maximal point (i.e. the second position). At this maximal point, shroud apertures 62 are misaligned with feed apertures 64 to prevent access to the seeds in the bird feeder 12. By adjusting the area in between the elongated member 35 and the lower cap 40, the spring 30 has less space in which to compress. In turn, this affects the ability for the central rod 15 to be pulled downwardly relative to the seed tray 25, which allows an operator of a bird feeder 12 to adjust the relative positioning of the shroud apertures 62 and feed apertures 64. Such adjustment is desirable and advantageous in the art, as springs and coils vary in spring constant (i.e. the force to compress a spring), despite being manufactured by the same entity and having the same technical specifications. As such, some springs may compress easier under different loads than other springs that were manufactured to be technically identical. Compression loads are important in the present disclosure, as birds may have very lighter weights (for example 120 grams) and it is desirous for the spring not to compress under this weight and provide access to the feed. Conversely, squirrels are heavier (for example over 400 grams) and it is desirous for the spring to compress under this weight. The present spring system 10 provides the ability to adjust the initial compression of the spring 30, thereby adapting to the manufacturing differences in springs.

With specific reference to FIG. 2A and according to an embodiment of the present disclosure, the underside of the lower cap 40 is shown in greater detail. As shown, the underside of the lower cap 40 is further comprised of a first indentation 51 and a second indentation (not shown) positioned on the opposite side of the first indentation 51. The first indentation 51 cooperates with a first nub 52 of the central rod 15, while second indentation (not shown) cooperates with a second nub (not shown) of the central rod 15. As the spring (not shown) compresses and expands along the central rod 15, the lower cap 40 travels up and down along the central rod 15. When the spring (not shown) is in a fully extended position as best shown in FIG. 3, the first nub 52 and second nub (not shown) act as stoppers and prevent the first indentation 51 and second indentation (not shown), respectively, from sliding further down along the central rod 15. As such, the lower cap 40 cannot slide off and be removed from the central rod 15.

Figure 5:
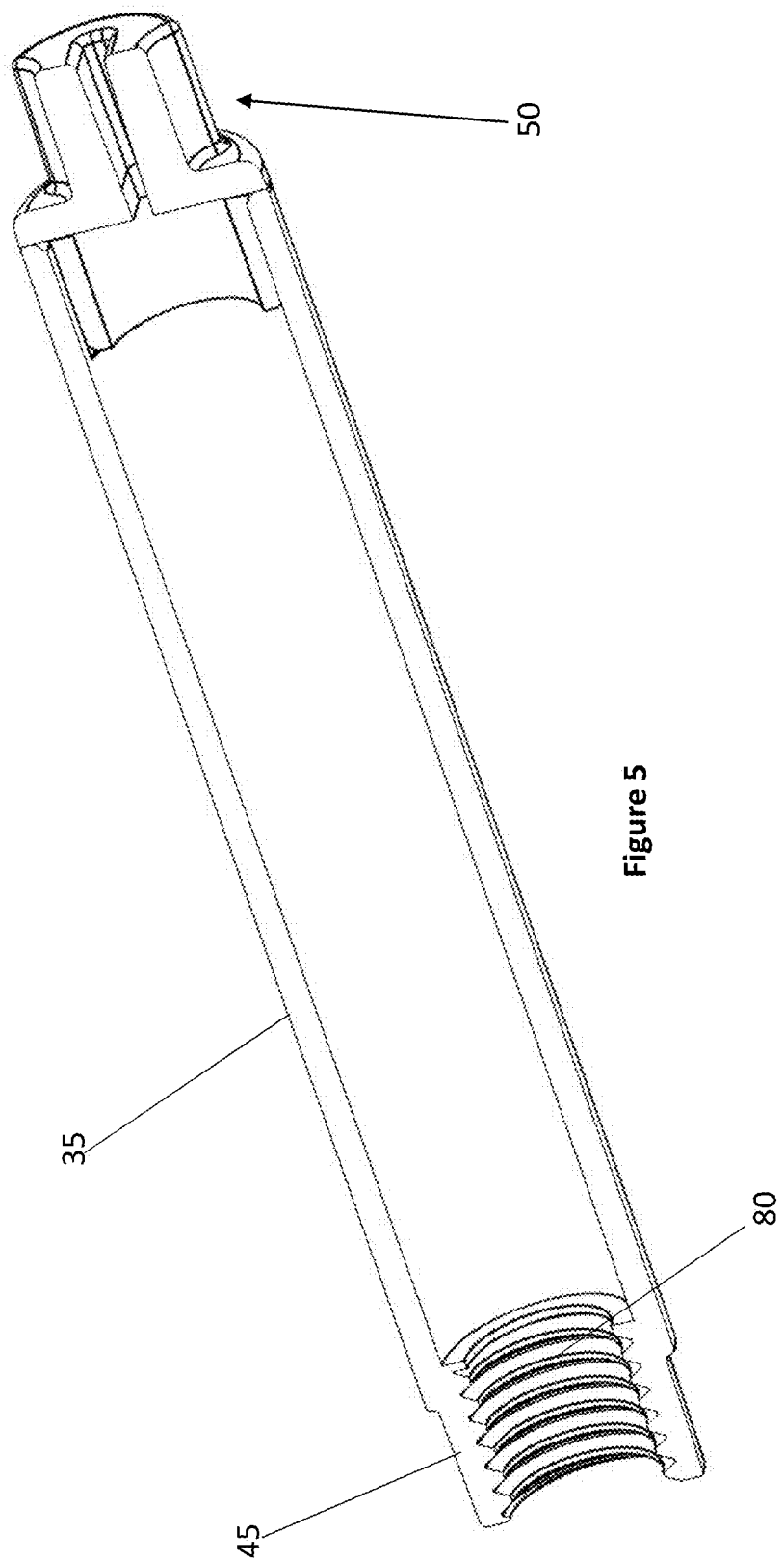
FIG. 5 is a cross-sectional view of the member and the end cap of the adjustable spring system shown in FIG. 1, according to an embodiment of the present disclosure.

With reference to FIGS. 4 and 5 and according to an embodiment of the present disclosure, the elongated member 35 and end cap 50 are shown in greater detail. The elongated member 35 is further comprised of a stepped portion 45 at a lower end of the member 35, the stepped portion 45 to abut against the spring (not shown). The elongated member 35 is further comprised of two opposed latching apertures 65, 67, the latching apertures 65, 67 to receive a hook 70 on pivoting arms 75 of the end cap 50. The end cap 50 is also comprised of an opening 55 adapted to receive a screwdriver to rotate the end cap 50. As the end cap 50 is secured to the elongated member 35, rotational movement of the end cap 50 correspondingly rotates the elongated member 35. The elongated member 35 is also comprised of inner threads 80 positioned on an interior surface of the tapered portion 45 of the member 35. The inner threads 80 mate with outer threads (not shown) of the central rod (not shown). A worker skilled in the art would appreciate that the opening 55 depicted as a slit is merely exemplary, and other grasping means could be present, such as Torx™, hex, diamond, or square openings.

Figure 6:
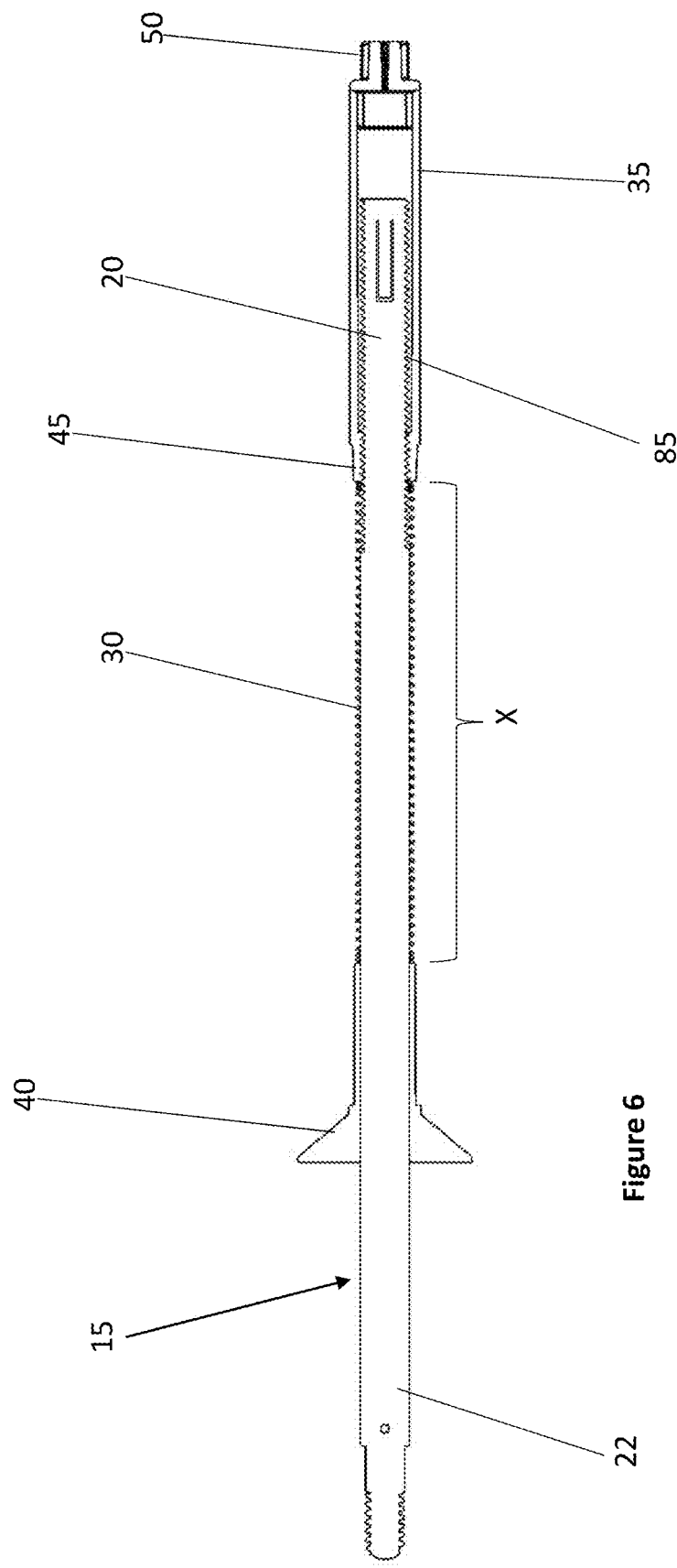
FIG. 6 is a side cross-sectional view of the adjustable spring system shown in FIG. 1, according to an embodiment of the present disclosure.
Figure 7:
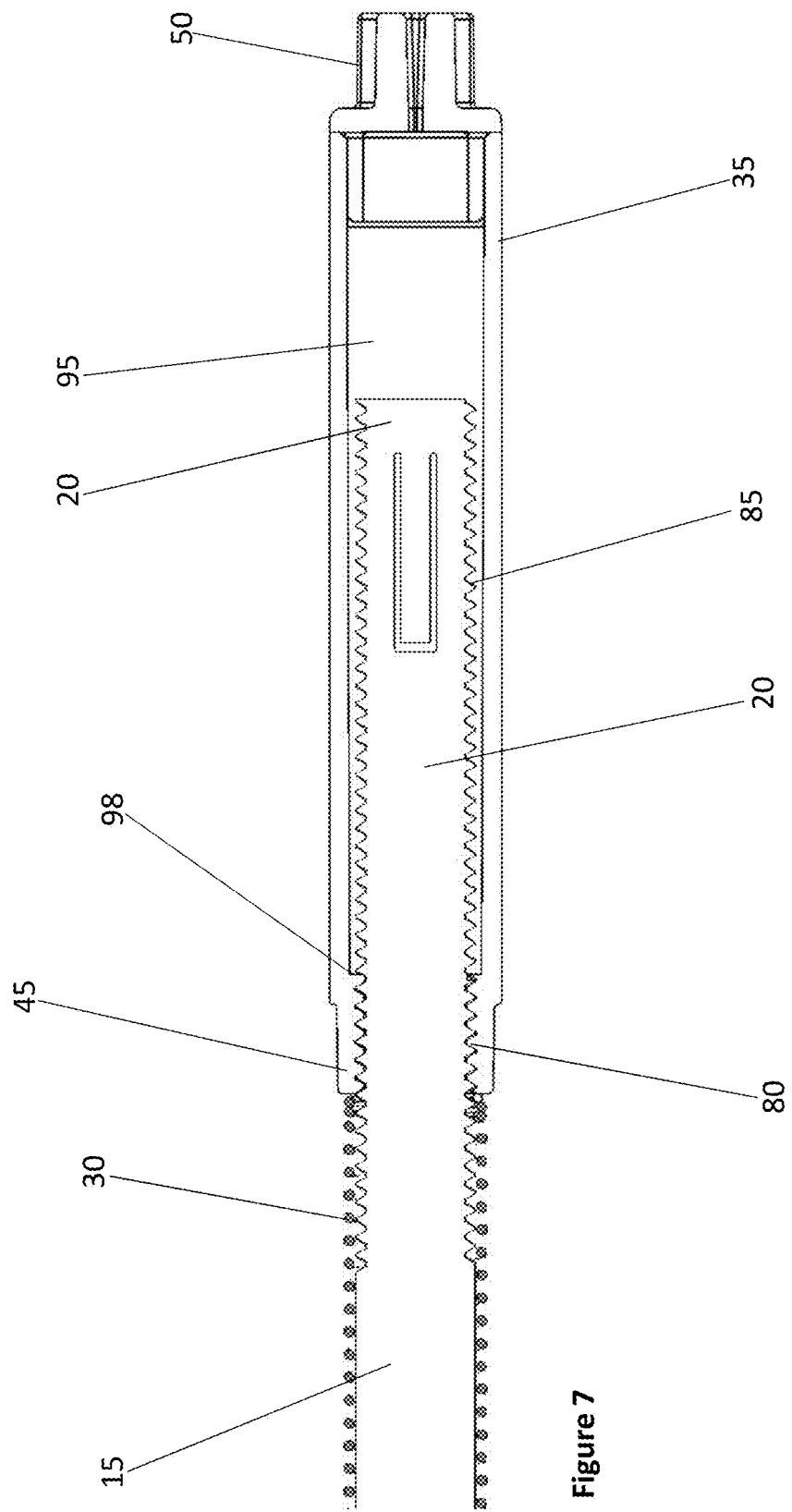
FIG. 7 is an enlarged side cross-sectional view of an upper portion of the adjustable spring system shown in FIG. 1, according to an embodiment of the present disclosure.
Figure 8:
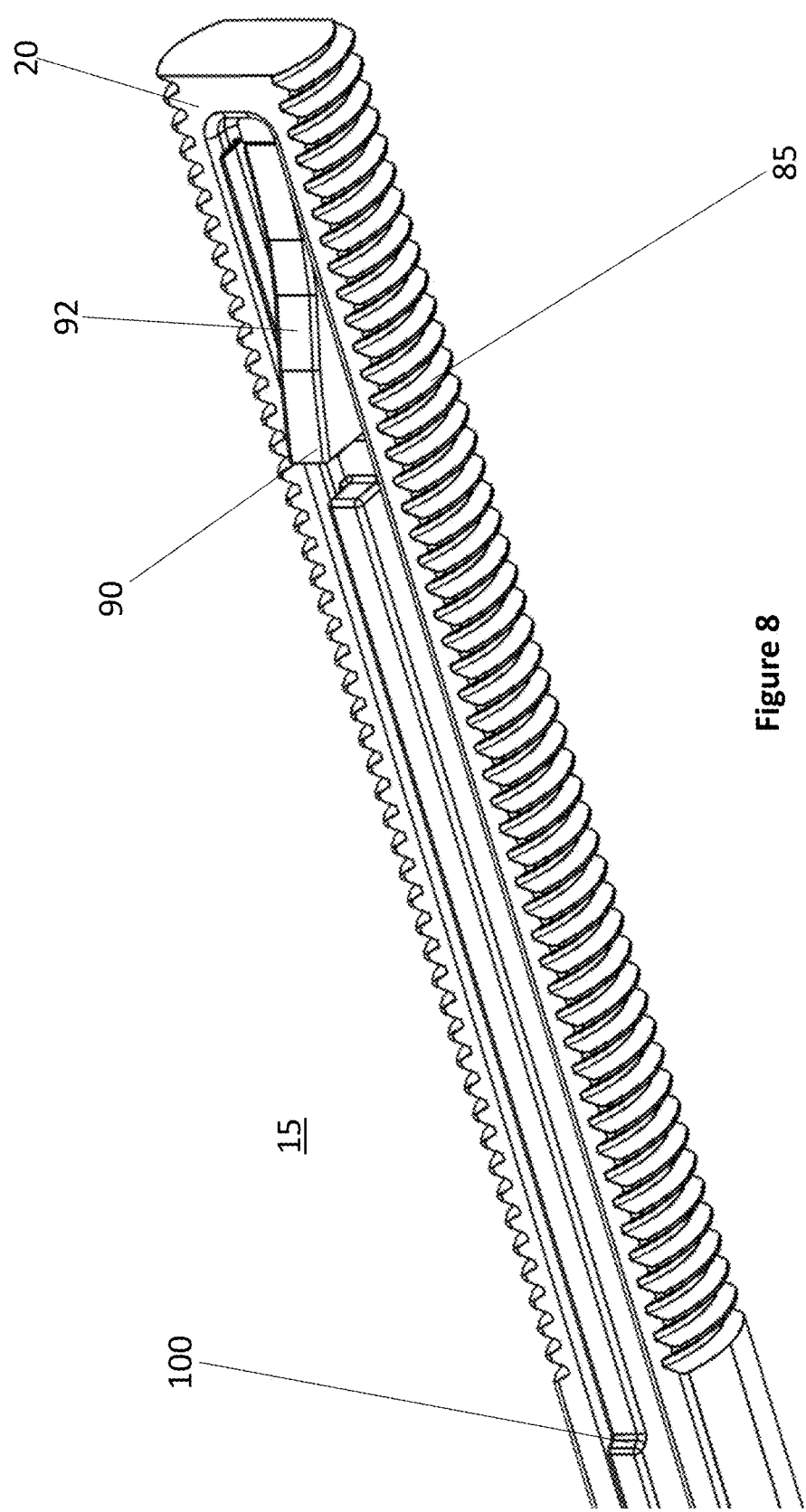
FIG. 8 is an enlarged perspective view of the upper portion of the central rod of the adjustable spring system shown in FIG. 1, according to an embodiment of the present disclosure; and, FIG. 9 is a cross-sectional view of a member for use in a bird feeder, according to another embodiment of the present disclosure.

With reference to FIGS. 6, 7 and 8 and according to an embodiment of the present disclosure, the central rod 15 is shown positioned through the lower cap 40 and into the elongated member 35. The central rod 15 is further comprised of outer threads 85 positioned on the upper portion 20. The outer threads 85 of the central rod 15 engage with inner threads 80 of the elongated member 35, such that rotation of the elongated member 35 moves the member 35 upwardly or downwardly with respect to the central rod 15. The central rod 15 is further comprised of a pivotable stopper 90, the pivotable stopper 90 located along the length of the central rod 15 and protruding therefrom. When the central rod 15 is inserted within and threaded onto the elongated member 35, a sloped segment 92 of the pivotable stopper 90 comes into contact with the stepped portion 45 of the central rod 15. Continued insertion of the central rod 15 forces the stepped portion 45 over the sloped segment 92, which pivots the stopper 90 downwardly. Eventually the stopper 90 is forced through the stepped portion 45 and into an enlarged cavity 95 of the elongated member 35. Once the stopper 90 is in the enlarged cavity 95, the upper end 20 of the central rod 15 is trapped within the elongated member 35. The elongated member 35 can no longer be removed from the central rod 15, as the stopper 90 will abut an inner peripheral wall 98 of the elongated member 35. At this moment, the elongated member 35 is only moveable within a range in between a first position to a second position. A worker skilled in the art would appreciate that the first position is defined as when the stopper 90 abuts the inner peripheral wall 98 of the elongated member 35. In this first position, the spring 30 is in its most extended state in the spring system 10. Meanwhile, the second position is defined as when the stepped portion 45 abuts a wall 100 of the central rod 15. In this second position, the spring 30 is in its most compressed state in the spring system 10. To move the elongated member 35 from the first position to the second position, the end cap 50 is rotated either clockwise or counterclockwise, which in turn moves the elongated member 35 up and down along the central rod 15 and compresses or decompresses the spring 30 to the desired amount. As specifically shown in FIG. 6, the spring 30 is confined in area X, defined as the area in between the stepped portion 45 and the lower cap 40. When the spring 30 is moved between the most compressed to most extended state, the spring 30 necessarily remains in area X. A purpose of the present disclosure is to provide manufacturers the ability to adjust the travel of the spring 30 from a desired extended position to the compressed position.

Figure 9:
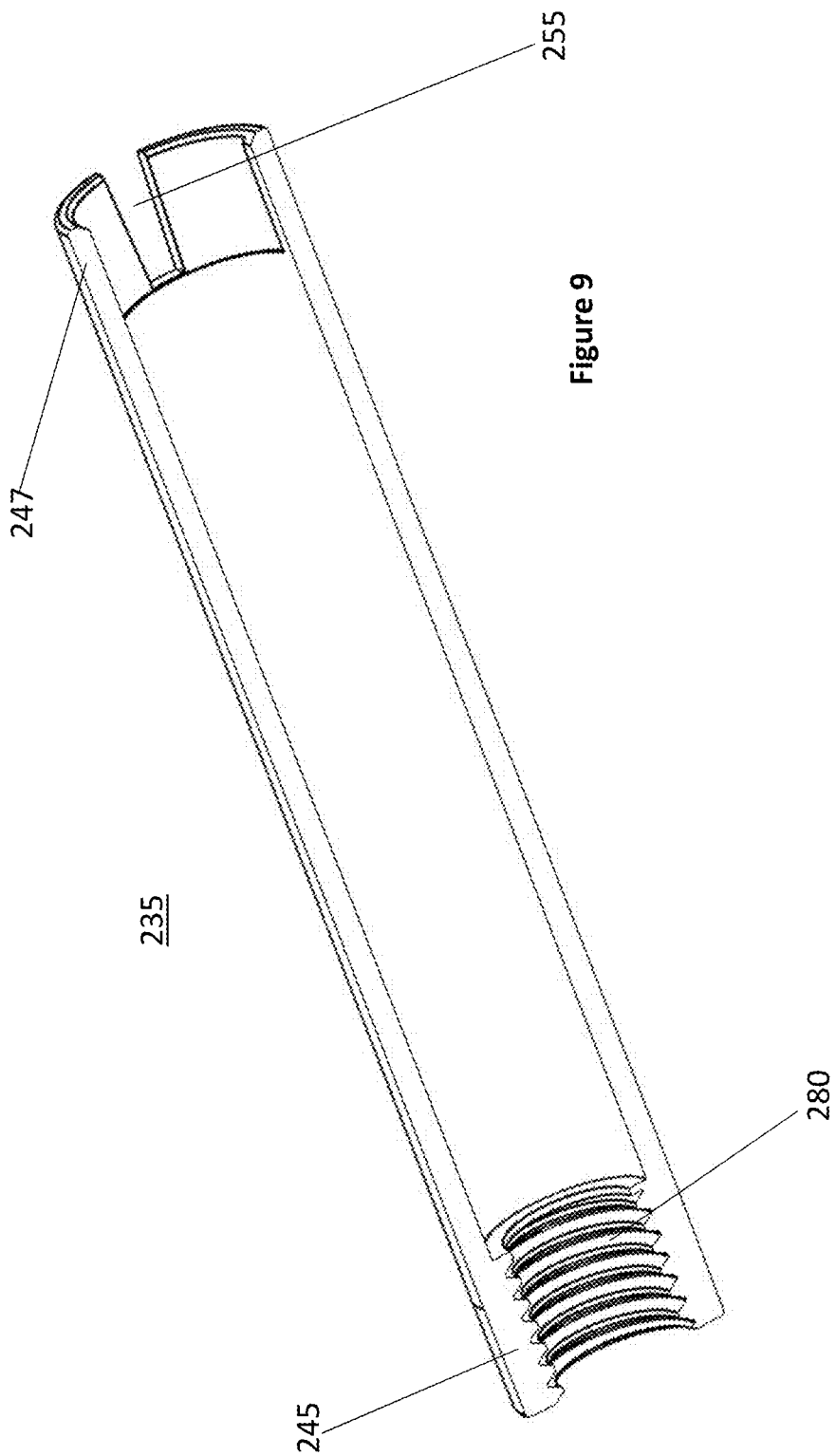

With reference to FIG. 9 and according to another embodiment of the present disclosure, an elongated member 235 is shown. The elongated member 235 is comprised of inner threads 280, positioned on an interior surface of a lower end 245 of the elongated member 235. The inner threads 280 mate with outer threads (not shown) of the central rod (not shown). In this alternate embodiment, the elongated member 235 is not comprised of an end cap. Instead, an upper end 247 of the elongated member 235 has a grasping means in the form of a slit 255, such that a tool such as a screwdriver can rotate the elongated member 235. Indeed, a screwdriver can be inserted into the slit 255 to rotate the elongated member 235. Rotation of the member 235 moves the elongated member 235 along the central rod (not shown). Although one slit 255 is shown, a worker skilled in the art would appreciate that there are two slits to preferably rotate the elongated member 235. In yet another embodiment, the elongated member 235 could have any form of grasping means at an upper end 247 thereof, provided that a tool can cooperate with the grasping means to rotate the elongated member 235 and therefore adjust the initial spring compression as described above. For example, such a grasping means could be a series of grooves to cooperate with a grooved tool, or even have no slits and cooperate with a tool that has a circular (or other) friction tip.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. An adjustable spring system for use with a bird feeder, the adjustable spring system comprising:
   a central rod having an upper end and a lower end;
   a compressible component positioned around the central rod;
   an elongated member locked to and surrounding the upper end of the central rod, the elongated member moveable in between a first position and a second position along the central rod; and,
   a lower cap positioned at the lower end of the central rod,
   wherein adjustment of the elongated member moves the elongated member from the first position to the second position,
   wherein the elongated member is locked in between the first position and the second position,
   wherein the upper end of the central rod is further comprised of a stopper to lock the central rod inside the elongated member,
   and wherein the stopper pivots from a rested position to a pivoted position to allow insertion of the central rod within the elongated member, the stopper pivoting back from the pivoted position to the rested position when the central rod is within the elongated member to lock the central rod to the elongated member.

2. The adjustable spring system of claim 1 wherein the elongated member is further comprised of a grasping means and wherein actuation of the grasping means correspondingly moves the elongated member up and down the central rod.

3. The adjustable spring system of claim 1 wherein the upper end of the central rod is further comprised of outer threads configured to mate with inner threads of the elongated member, wherein the lower end of the elongated member is further comprised of a stepped portion, and wherein the inner threads are positioned on the stepped portion.

4. The adjustable spring system of claim 1 wherein the central rod is further comprised of at least one nub, and wherein the lower cap is further comprised of at least one indentation, the at least one indentation cooperating with the at least one nub to stop and prevent the lower cap from sliding down the central rod.

5. A bird feeder comprising:
   a seed container to contain seeds;
   a seed tray secured to the seed container, the seed tray comprised of at least one opening to access the seeds;
   a shroud connected to the seed tray, the shroud to protect at least a portion of the seed container and seed tray;
   a cover releasably secured to the seed container; and,
   an adjustable spring system secured to the seed tray, the adjustable spring system providing for an adjustable movement of the shroud relative to the seed tray between a first location and a second location, the adjustable spring system further comprising:
      a central rod having an upper end and a lower end;
      a compressible component positioned around the central rod;
      an elongated member locked to and surrounding the upper end of the central rod, the elongated member moveable in between a first position and a second position along the central rod; and,
      a lower cap positioned at the lower end of the central rod,
   wherein adjustment of the elongated member moves the elongated member from the first position to the second position,
   wherein the elongated member is locked in between the first position and the second position,
   wherein the upper end of the central rod is further comprised of a stopper to lock the central rod inside the elongated member,
   and wherein the stopper pivots from a rested position to a pivoted position to allow insertion of the central rod within the elongated member, the stopper pivoting back from the pivoted position to the rested position when the central rod is within the elongated member to lock the central rod to the elongated member.

6. The bird feeder of claim 5 wherein the elongated member is further comprised of a grasping means, and wherein actuation of the grasping means correspondingly moves the elongated member up and down the central rod.

7. The bird feeder of claim 5 wherein the central rod is further comprised of at least one nub, and wherein the lower cap is further comprised of at least one indentation, the at least one indentation cooperating with the at least one nub to stop and prevent the lower cap from sliding down the central rod.

8. The bird feeder of claim 5, the adjustable spring system further comprising an end cap, the end cap having an opening.

9. The adjustable spring system of claim 1, wherein the stopper is further comprised of a sloped segment configured to pivot when the central rod is inserted within the elongated member.

10. The adjustable spring system of claim 9, wherein the stopper abuts an inner peripheral wall of the elongated member in the first position, and a stepped portion of the elongated member abuts a raised wall of the central rod in the second position.

11. The bird feeder of claim 5, wherein the stopper is further comprised of a sloped segment configured to pivot when the central rod is inserted within the elongated member.

12. The bird feeder of claim 11, wherein the stopper abuts an inner peripheral wall of the elongated member in the first position, and a stepped portion of the elongated member abuts a raised wall of the central rod in the second position.

* * * * *